(12) United States Patent
Zhu et al.

(10) Patent No.: US 9,807,776 B2
(45) Date of Patent: Oct. 31, 2017

(54) METHOD AND APPARATUS FOR CROSS-SUBFRAME INTERFERENCE COORDINATION

(71) Applicant: NEC (CHINA) CO., LTD., Beijing (CN)

(72) Inventors: Dalin Zhu, Beijing (CN); Ming Lei, Beijing (CN)

(73) Assignee: NEC(CHINA) CO., Ltd., Beijing (CN)

( * ) Notice: Subject to any disclaimer, the term of this patent is extended or adjusted under 35 U.S.C. 154(b) by 45 days.

(21) Appl. No.: 14/761,543

(22) PCT Filed: Jan. 17, 2013

(86) PCT No.: PCT/CN2013/070615
§ 371 (c)(1),
(2) Date: Jul. 16, 2015

(87) PCT Pub. No.: WO2014/110762
PCT Pub. Date: Jul. 24, 2014

(65) Prior Publication Data
US 2015/0365957 A1    Dec. 17, 2015

(51) Int. Cl.
*H04W 72/08*  (2009.01)
*H04L 5/14*  (2006.01)
*H04B 7/06*  (2006.01)
*H04W 24/04*  (2009.01)
*H04W 72/04*  (2009.01)

(52) U.S. Cl.
CPC ........ *H04W 72/082* (2013.01); *H04B 7/0617* (2013.01); *H04B 7/0634* (2013.01); *H04L 5/1469* (2013.01); *H04W 24/04* (2013.01); *H04W 72/0446* (2013.01)

(58) Field of Classification Search
CPC .... H04W 72/082; H04W 24/04; H04L 5/1469
See application file for complete search history.

(56) References Cited

U.S. PATENT DOCUMENTS

| | | | |
|---|---|---|---|
| 2011/0176435 A1 | 7/2011 | Khandekar et al. | |
| 2011/0201377 A1 | 8/2011 | Kazmi | |
| 2013/0272170 A1* | 10/2013 | Chatterjee | H04W 28/02 370/280 |

(Continued)

FOREIGN PATENT DOCUMENTS

| | | |
|---|---|---|
| CN | 102754494 A | 10/2012 |
| WO | 2012/095745 A1 | 7/2012 |

OTHER PUBLICATIONS

International Search Report of PCT/CN2013/070615 dated Oct. 24, 2013.

(Continued)

*Primary Examiner* — Gbemileke J Onamuti
(74) *Attorney, Agent, or Firm* — Sughrue Mion, PLLC

(57) ABSTRACT

Embodiments of the disclosure provide a method and apparatus for cross-subframe interference coordination in a dynamic TDD system. The method comprises steps of: obtaining UL-DL configurations employed by a plurality of cells in the dynamic TDD system; and determining, based on the UL-DL configurations, a beamforming vector of at least one interfering cell which has cross-subframe interference on at least one interfered cell, so as to reduce the cross-subframe interference.

18 Claims, 5 Drawing Sheets

(56) References Cited

U.S. PATENT DOCUMENTS

2015/0163815 A1* 6/2015 Lei .................. H04W 16/10
370/280
2015/0195791 A1* 7/2015 Jiang ................ H04W 52/143
455/522

OTHER PUBLICATIONS

Written Opinion of the International Searching Authority of PCT/CN2013/070615 dated Oct. 24, 2013.
Communication dated May 24, 2016 from the Japanese Patent Office issued in corresponding Application No. 2015-552961.
"Discussion on interference mitigation schemes for FS_LTE_TDD_eIMTA", 3GPP TSG RAN WG1 Meeting #69, R1-122061, Prague, Czech Republic, May 21-25, 2012, 3 pages total.
"Coordinated Scheduling and Beamforming based Interference Mitigation Scheme in Dynamic TDD", 3GPP TSG RAN WG1 Meeting #72, R1-130367, St. Julian's, Malta, Jan. 28-Feb. 1, 2013, 9 pages total.

* cited by examiner

METHOD AND APPARATUS FOR CROSS-SUBFRAME INTERFERENCE COORDINATION

CROSS REFERENCE TO RELATED APPLICATIONS

This is a National Stage of International Application No. PCT/CN2013/070615 filed Jan. 17, 2013, the contents of which are incorporated herein by reference in its entirety.

FIELD OF THE INVENTION

Embodiments of the present invention generally relate to communication techniques. More particularly, embodiments of the present invention relate to methods and apparatuses for cross-subframe interference coordination.

BACKGROUND OF THE INVENTION

Generally, two different duplex modes are employed for separating the transmission directions from the user to the base station and back: Frequency Division Duplex (FDD) and Time Division Duplex (TDD). In the TDD mode, a single bandwidth is shared between uplink (UL) and downlink (DL), with the sharing being performed by allotting different periods of time to uplink and downlink.

Taking a Long Term Evolution (LTE) or LTE-Advanced (LTE-A) TDD system for example, there are seven different patterns of uplink/downlink switching, termed uplink-downlink configurations 0 through 6, each of them having a different DL and UL allocation between each other. The LTE TDD system allows for asymmetric UL-DL allocations by the seven different uplink-downlink configurations. Generally, the LTE TDD system statically or semi-statically allocates the UL-DL configuration among cells. Conventionally, all neighboring cells have the same uplink-downlink configuration, e.g., configuration 0, after configurations of the cells are deployed by the LTE TDD system. The configuration allocation is not changed during operation (static allocation) or is changed after years of operation (semi-static allocation).

In some scenarios, the static or semi-static allocation may not match the burst traffic conditions, e.g., the FTP traffic. Accordingly, dynamic configuration allocation is proposed for matching the traffic conditions better. As such, the neighboring cells may have different uplink-downlink configurations from each other. By dynamically allocating UL-DL configurations to different cells, asymmetric DL and UL traffic demands may be well handled.

However, freely adjusting each cell's UL-DL configuration may result in significant cross-subframe interference, e.g., Cross-subframe Co-channel Interference (CCI), including both BS-BS CCI and UE-UE CCI, which would significantly degrade the system performance. This CCI is brought by the opposite-direction transmissions in neighboring cells when dynamic UL-DL configuration/reconfiguration is enabled.

Since the BSs usually have higher transmission power and more transmit antennas than the UEs, the BS-BS interference is more severe than the UE-UE interference. Therefore, there is a need to find interference avoidance/mitigation schemes for eliminating the negative impact on the system performance arising from the BS-BS CCI.

SUMMARY OF THE INVENTION

The present invention proposes a solution to coordinate cross-subframe interference, especially the BS-BS interference. Specifically, the present invention provides a method and apparatus for cross-subframe interference coordination in a dynamic TDD system, such that the throughput in the system is effectively improved.

According to a first aspect of the present invention, embodiments of the invention provide a method for cross-subframe interference coordination in a dynamic TDD system. The method may comprise: obtaining UL-DL configurations employed by a plurality of cells in the dynamic TDD system; and determining, based on the UL-DL configurations, a beamforming vector of at least one interfering cell which has cross-subframe interference on at least one interfered cell, so as to reduce the cross-subframe interference.

According to a second aspect of the present invention, embodiments of the invention provide an apparatus for cross-subframe interference coordination in a dynamic TDD system. The apparatus may comprise: an obtainer configured to obtain UL-DL configurations employed by a plurality of cells in the dynamic TDD system; and a determiner configured to determine, based on the UL-DL configurations, a beamforming vector of at least one interfering cell which has cross-subframe interference on at least one interfered cell, so as to reduce the cross-subframe interference.

Compared with those existing solutions, the proposed solution effectively reduces the cross-subframe interference and improves the throughput of the dynamic TDD system.

Other features and advantages of the embodiments of the present invention will also be apparent from the following description of specific embodiments when read in conjunction with the accompanying drawings, which illustrate, by way of example, the principles of embodiments of the invention.

BRIEF DESCRIPTION OF THE DRAWINGS

Embodiments of the invention are presented in the sense of examples and their advantages are explained in greater detail below, with reference to the accompanying drawings, where.

DETAILED DESCRIPTION OF EMBODIMENTS

Embodiments of the invention will be described thoroughly hereinafter with reference to the accompanying drawings. It will be apparent to those skilled in the art that the invention may, however, be embodied in many different forms and should not be construed as limited to the embodiments and specific details set forth herein. Like numbers refer to like elements throughout the specification.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Embodiments of the present invention may be applied in various dynamic TDD systems, including but not limited to a LTE or a LTE-A system. Given the rapid development in communications, there will of course also be future type wireless communication technologies and systems with which the present invention may be embodied. It should not be seen as limiting the scope of the invention to only the aforementioned system.

In the disclosure, a user equipment (UE) may refer to a terminal, a Mobile Terminal (MT), a Subscriber Station (SS), a Portable Subscriber Station (PSS), Mobile Station (MS), or an Access Terminal (AT), and some or all of the functions of the UE, the terminal, the MT, the SS, the PSS, the MS, or the AT may be included.

In the disclosure, a base station (BS) may represent, e.g., a node B (NodeB or NB), an evolved NodeB (eNodeB or eNB), a Remote Radio Unit (RRU), a radio header (RH), a remote radio head (RRH), a relay, a low power node such as a femto, a pico, and so on.

Figure 1:
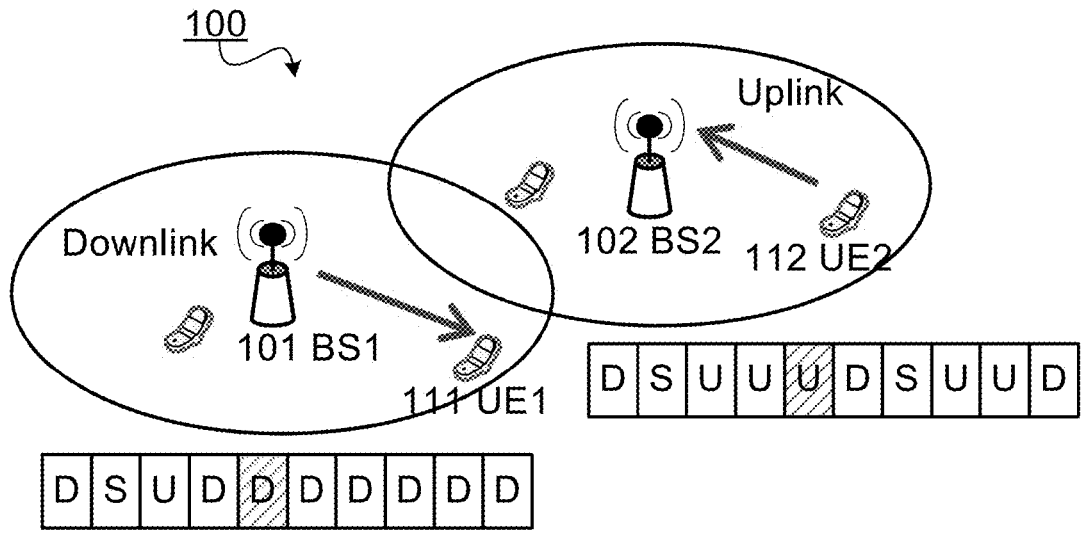
FIG. 1 illustrates a schematic diagram of a dynamic TDD system 100 comprising cross-subframe interference according to embodiments of the invention.

Reference is first made to FIG. 1, which illustrates a schematic diagram of a dynamic TDD system 100 comprising cross-subframe interference according to embodiments of the invention.

The system 100 is exemplarily illustrated as a LTE system. For a LTE TDD system, there are seven different patterns of uplink/downlink switching, termed uplink-downlink configurations 0 through 6. LTE TDD system allows for asymmetric UL-DL allocations by the seven different uplink-downlink configurations.

As shown in FIG. 1, the system 100 comprises a first base station, BS1 101 and a second base station, BS2 102. BS1 101 manages a cell and a use equipment UE1 111 is located in the cell and severed by BS1, wherein the cell is dynamically allocated with configuration 5 (D, S, U, D, D, D, D, D, D, D). At the same time, BS2 102 manages a cell and a use equipment UE2 112 is located in the cell and severed by BS2, wherein the cell is dynamically allocated with configuration 6 (D, S, U, U, U, D, S, U, U, D). It is seen that that the fifth subframe (shown in shadow) of configuration 5 is different from that of configuration 6. Specifically, the fifth subframe of configuration 5 is "D", while the fifth subframe of configuration 6 is "U". In other words, BS1 101 performs downlink transmission with UE1 111 in the fifth subframe, and BS2 102 performs uplink transmission with UE2 112 in the fifth subframe. As such, in the fifth subframe, the downlink transmission from BS1 to UE1 may interfere with the uplink transmission from UE2 to BS2. Accordingly, cross-subframe interference occurs.

As can be appreciated by those skilled in the art, the present disclosure can be applicable to any other suitable communication system, but not limited to the specific arrangement shown in FIG. 1. For example, in the case that a system comprises three cells allocated with three configurations, and in a certain subframe, uplink transmission is preformed in two cells while downlink transmission is preformed in one cell, cross-subframe interference also occurs. For example, in the case that a system comprises three cells allocated with three configurations, and in a certain subframe, uplink transmission is preformed in one cell while downlink transmission is preformed in two cells, cross-subframe interference also occurs.

To alleviate the cross-subframe interference, the following embodiments of the present invention provide methods and apparatuses for cross-subframe interference coordination.

Figure 2:
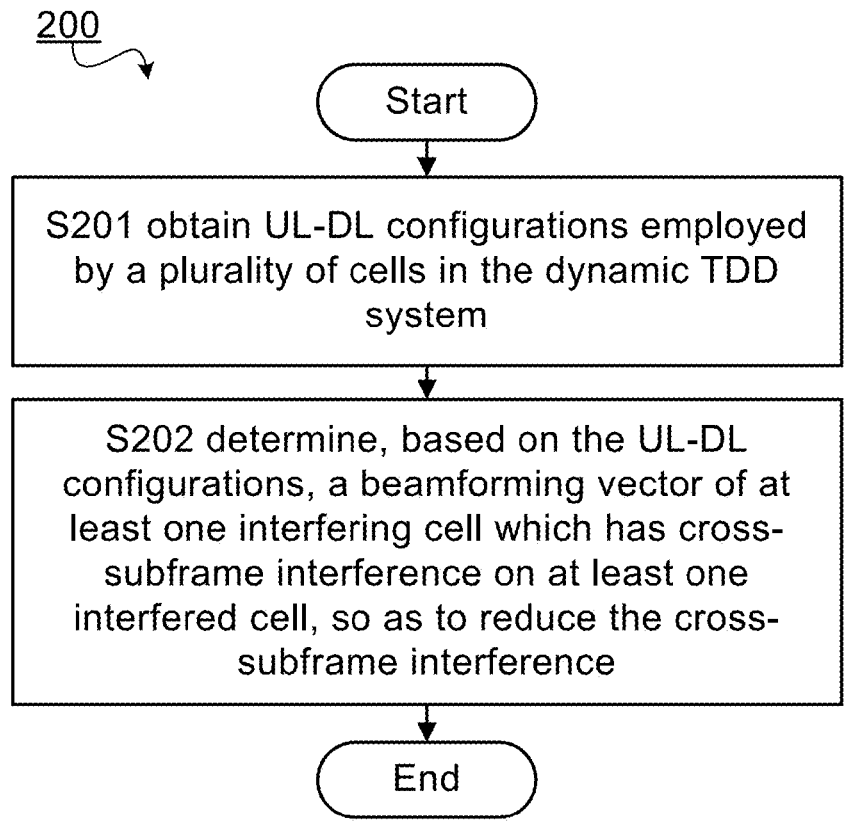
FIG. 2 illustrates a flow chart of a method 200 for cross-subframe interference coordination in a dynamic TDD system according to embodiments of the invention.

Reference is now made to FIG. 2, which illustrates a method 200 for cross-subframe interference coordination in a dynamic TDD system according to embodiments of the invention. In accordance with embodiments of the present invention, method 200 may be carried out by, for example, a BS, a Baseband Unit (BBU) pool, a central unit, a controller, a server or any other suitable device in the TDD system.

After method 200 starts, at step S201, UL-DL configurations employed by a plurality of cells in the dynamic TDD system are obtained.

According to embodiments of the present invention, the method according to embodiments of the present invention may be implemented under the framework of a centralized random access network (RAN). The centralized RAN may comprise one or more BBU pools and a plurality of Remote Radio Units (RRUs), which may connected via optical transport network. The plurality of RRUs may manage multiple cells and transmit, receive and/or measure signals in respective cells. The BBU pool may control, manage and/or coordinate operations of the plurality of RRUs. In some embodiments, the method 200 may be implemented at the BBU pool. It is to be noted that, besides the centralized RAN framework, the method according to embodiments of the present invention may be implemented in other suitable network, for example, in a heterogeneous network. As can be appreciated by those skilled in the art, the centralized RAN is an example, rather than limitation.

For a LTE TDD system, there are seven different patterns of uplink/downlink switching, termed uplink-downlink configurations 0 through 6. LTE TDD system allows for asymmetric UL-DL allocations by the seven different uplink-downlink configurations. Table 1 shows the seven UL-DL configurations defined for a LTE TDD system.

TABLE 1

| UL-DL Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |

TABLE 1-continued

UL-DL Configurations

| UL-DL Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 5 | D | S | U | D | D | D | D | D | D | D |
| 6 | D | S | U | U | U | D | S | U | U | D |

In Table 1, a subframe denoted as "D" means that the subframe is for downlink, a subframe denoted as "U" means that the subframe is for uplink, and a subframe denoted as "S" means that the subframe is a special subframe, which comprises guard period (GP), Uplink Pilot Time Slot (UpPTS), Downlink Pilot Time Slot (DwPTS), etc. From the Table 1, it is seen that LTE TDD system allows for asymmetric UL-DL allocations by the seven uplink-downlink configurations.

In accordance with embodiments of the present invention, the dynamic TDD system may comprise a plurality of cells. The plurality of cells may be dynamically allocated with a UL-DL configuration when time-scale for reconfiguration is satisfied. Thus, the UL-DL configurations employed by the cells may be obtained by receiving UL-DL configurations for cells dynamically allocated to the cells. For example, in some embodiments, for a cell, the UL-DL configuration may be dynamically allocated based on DL to UL subframe ratios of available configurations and DL to UL data ratio of the each cell. Each base station (e.g., a eNB, a RRU, and so on) managing a cell may report its newly allocated UL-DL configuration to a network node, such as a controller, a central unit, a BBU pool, a server, etc. Thus, the network node may obtain knowledge of UL-DL configurations employed by a plurality of cells in the dynamic TDD system upon receipt of the report.

In accordance with embodiments of the present invention, there may be a large number of cells in the dynamic TDD system. In this case, at step S201, the cells in the dynamic TDD system may be clustered into one or more cell clusters, and then, UL-DL configurations employed by cells in each of the one or more cell clusters may be obtained. In some embodiments, the cells may be clustered by determining Cross-subframe Co-channel Interference (CCI) indications between a reference cell and the plurality of the cells, wherein the reference cell is randomly selected from the plurality of the cells; and clustering the plurality of the cells into one or more cell clusters based on the CCI indications. Further details relating to the clustering may be found in descriptions in connection to embodiments illustrated with FIGS. 4 and 5.

At step S202, determine, based on the UL-DL configurations, a beamforming vector of at least one interfering cell which has cross-subframe interference on at least one interfered cell, so as to reduce the cross-subframe interference.

In accordance with embodiments of the present invention, based on the UL-DL configurations employed by a plurality of cells, as obtained at step S201, at least one interfering cell and at least one interfered cell may be determined from the plurality of cells. Then, UEs in the at least one interfering cell and the at least one interfered cell may be divided into one or more UE groups, wherein a UE group at least includes a UE in the at least one interfering cell and a UE in the at least one interfered cell. Next, one or more beamforming vectors associated with the one or more UE groups may be calculated and a beamforming vector maximizing uplink capacity of the at least one interfered cell may be selected from the one or more beamforming vectors.

According to some exemplary embodiments of the present invention, the one or more beamforming vectors associated with the one or more UE groups may be calculated by: calculating a signal leakage value with respect to a UE group, wherein the signal leakage value indicating signal leakage from the at least one interfering cell to the at least one interfered cell; and determining a beamforming vector minimizing the signal leakage value as the beamforming vector associated with the UE group.

According to further exemplary embodiments of the present invention, a beamforming vector maximizing uplink capacity of the at least one interfered cell may be selected by: calculating capability values of the at least one interfered cell based on the one or more beamforming vectors; and selecting the beamforming vector associated with the largest one of the calculated capability values from the one or more beamforming vectors.

Figure 3:
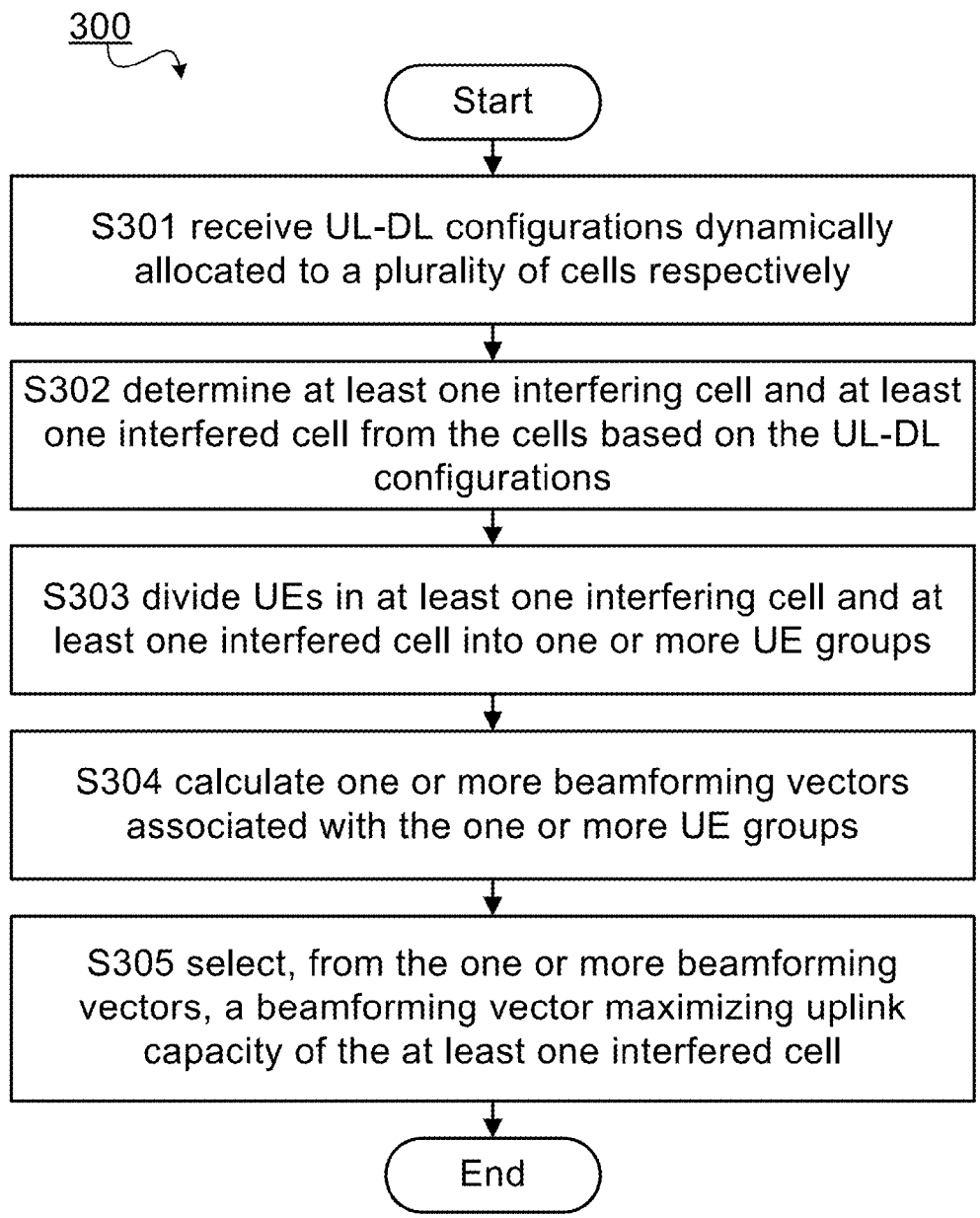
FIG. 3 illustrates a flow chart of a method 300 for cross-subframe interference coordination in a dynamic TDD system according to further embodiments of the invention.

Further details relating to the clustering may be found in descriptions in connection to embodiments illustrated with FIG. 3.

With respect to embodiments illustrated by FIG. 2, it is advantageous that, different from the existing solutions, the uplink performance is efficiently improved by reducing the BS-BS cross-subframe interference. It is also advantageous that, no serious downlink performance degradation is introduced.

FIG. 3 illustrates a flow chart of a flow chart of a method 300 for cross-subframe interference coordination in a dynamic TDD system according to further embodiments of the invention. Method 300 may be considered as an embodiment of method 200 described above with reference to FIG. 2. In the following description of method 300, a beamforming vector maximizing uplink capacity of the at least one interfered cell is selected, so as to reduce the cross-subframe interference of interfering cell(s) on interfered cell(s). However, it is noted that this is only for the purpose of illustrating the principles of the present invention, rather than limiting the scope thereof.

At step S301, UL-DL configurations dynamically allocated to a plurality of cells respectively are received.

According to embodiments of the present invention, for each of the plurality of cells, the UL-DL configuration may be dynamically allocated based on DL to UL subframe ratios of available configurations and DL to UL data ratio of the each cell. For example, with respect to one cell, in response to that time-scale for reconfiguration in the cell is satisfied, a DL to UL data ratio for the cell may be calculated based on data volume in a DL buffer and a UL buffer; next, DL to UL subframe ratios of available configurations may be obtained; and a configuration whose DL to UL subframe ratio is closest to the DL to UL data ratio may be selected from the available configurations as the UL-DL configuration allocated to the cell. In this way, the UL-DL configurations for all of the plurality of cells in the dynamic TDD system may be obtained.

In an exemplary embodiment, if the time-scale for reconfiguration is satisfied (e.g., every Xms), the dynamic UL-DL configuration allocation may be enabled. Taking one of the plurality cell for example, the cell may select a configuration that has the closest UL-DL ratio to the ratio of the amount of data in its DL and UL buffers.

To illustrate this process, first the UL-DL ratio of configuration 1 may be calculated as $$K_l^c = \frac{N_l^{DL} \times N_{OFDM} + N_l^S \times K_{DwPTS}}{N_l^{UL} \times N_{OFDM} + N_l^S \times K_{UpPTS}} \quad (1)$$

$$l = 0, 1, \ldots, 6.$$

Here, $N_l^{DL}$ and $N_l^{UL}$ represent the number of DL and UL subframes in one radio frame of configuration l, respectively; $N_l^S$ corresponds to the number of special subframes in one radio frame of configuration l; $N_{OFDM}$ denotes the number of OFDM symbols in one subframe; $K_{UpPTS}$ and $K_{DwPTS}$ are ratios of UpPTS and DwPTS in one special frame, respectively.

Then, the ratio of the data volume in each cell's DL and UL buffers may be calculated as $$K_b = \frac{B_D}{B_U} \quad (2)$$

Here, $B_D$ and $B_U$ correspond to the number of packets in the DL and UL buffers, respectively.

$B_D$ and $B_U$ may be further expressed as $$B_D = \sum_{n=1}^{N} B_n^D \quad (3)$$

$$B_U = \sum_{n=1}^{N} B_n^U$$

Here, N denotes the total number of UEs, $B_n^D$ and $B_n^U$ represent the number of DL and UL packets requested by user n, respectively.

After all, the cell may select a configuration that has the closest DL/UL ratio to the ratio of the data volume in each cell's DL and UL buffers, e.g., by calculating $$l_a = \arg \min_{l=0,1,\ldots,6} |K_l^c - K_b|, \quad (4)$$

where $l_a$ is the index of the selected UL-DL configuration.

It is to be noted that, besides the scheme of dynamic UL-DL configuration allocation illustrated above, some embodiments of the present invention may employ other suitable schemes of dynamic UL-DL configuration allocation. The above embodiments are illustrated only for example, rather than limitation.

At step S302, at least one interfering cell and at least one interfered cell are determined from the cells based on the UL-DL configurations.

With the UL-DL configurations, the interfering cell(s) and the interfered cell(s) may be determined. With respect to FIG. 1, the UL-DL configurations employed by the cells managed by BS1 and BS2 may be obtained at step S301, i.e., configuration 5 and configuration 6. Since the fifth subframe of configuration 5 is "D" and the fifth subframe of configuration 6 is "U", the downlink transmission from BS1 to UE1 may interfere with the uplink transmission from UE2 to BS2. As such, the cell managed by BS1 may be determined as an interfering BS and the cell managed by BS2 may be determined as an interfered BS.

Figure 7:
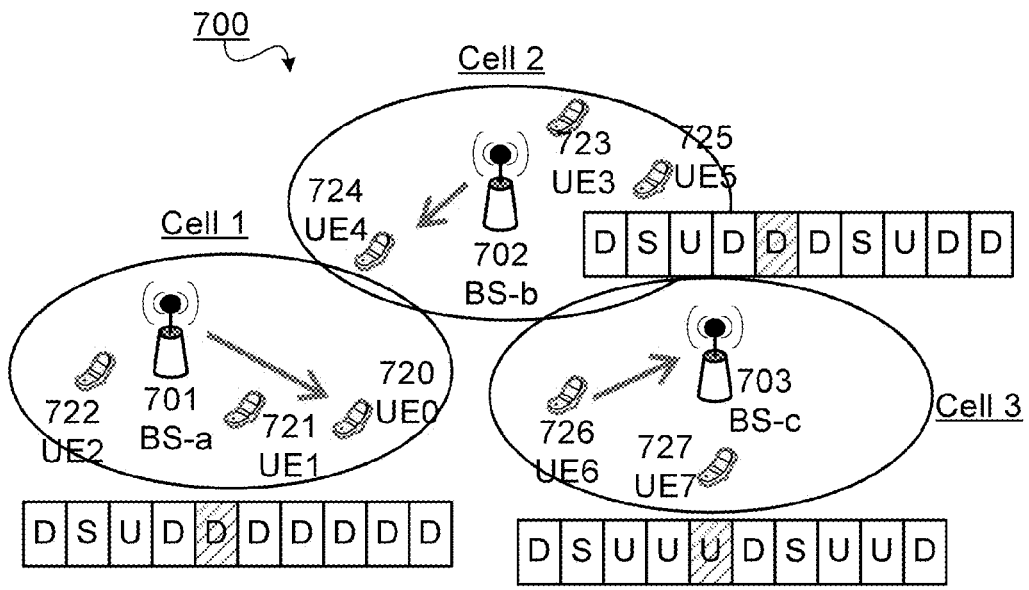
FIG. 7 illustrates a schematic diagram of a dynamic TDD system 700 employing cross-subframe interference coordination according to some embodiments of the invention.

Reference is now made to embodiments shown with FIG. 7, which illustrates a schematic diagram of a dynamic TDD system 700 employing cross-subframe interference coordination according to some embodiments of the invention. In the embodiments illustrated in FIG. 7, cell 1 is allocated with configuration 5 (D, S, U, D, D, D, D, D, D, D), cell 2 is allocated with configuration 2 (D, S, U, D, D, D, D, D, D, D), and cell 3 is allocated with configuration 6 (D, S, U, U, U, D, S, U, U, D). With respect to the fifth subframe, cell 1 and cell 2 may be determined as interfering BSs and cell 3 may be determined as an interfered BS.

Figure 8:
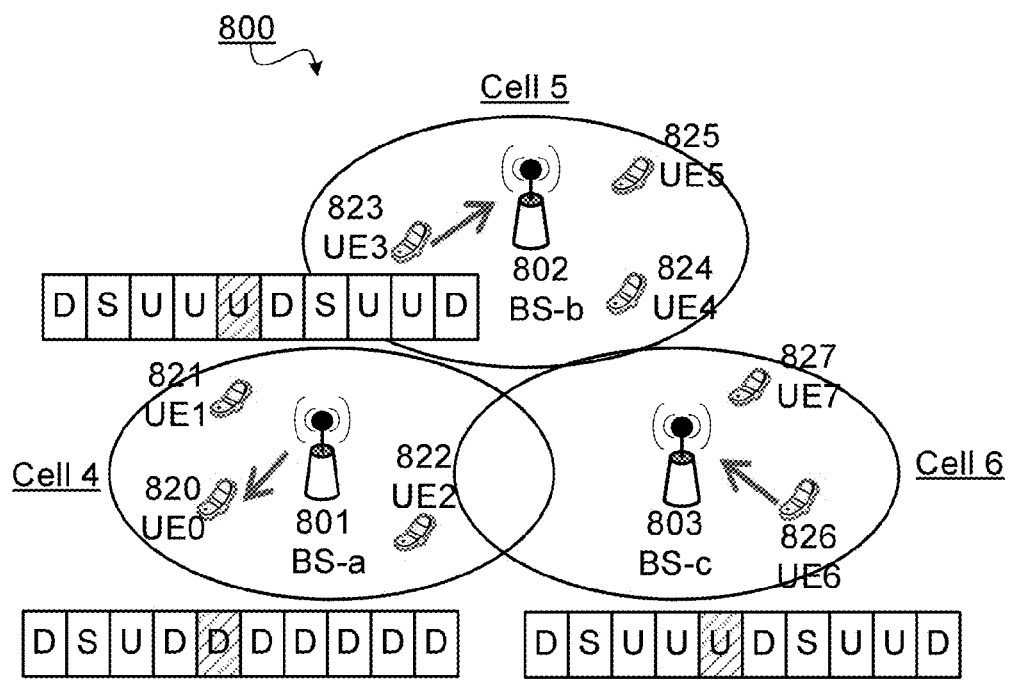
FIG. 8 illustrates a schematic diagram of a dynamic TDD system 800 employing cross-subframe interference coordination according to some other embodiments of the invention.

Reference is now made to embodiments shown with FIG. 8, which illustrates a schematic diagram of a dynamic TDD system 800 employing cross-subframe interference coordination according to some other embodiments of the invention. In the embodiments illustrated in FIG. 8, cell 4 is allocated with configuration 5 (D, S, U, D, D, D, D, D, D, D), cell 4 is allocated with 6 (D, S, U, U, U, D, S, U, U, D), and cell 6 is allocated with configuration 6 (D, S, U, U, U, D, S, U, U, D). With respect to the fifth subframe, cell 4 may be determined as an interfering BS, and cell 5 and cell 6 may be determined as interfered BSs.

At step S303, UEs in at least one interfering cell and at least one interfered cell are divided into one or more UE groups.

According to embodiments of the present invention, a UE group at least includes a UE in the at least one interfering cell and a UE in the at least one interfered cell.

In embodiments shown in FIG. 7, UE0, 1, 2, . . . , 7 may be candidate UEs that have either DL or UL packets to transmit or receive. UEs that would probably transmit/receive packets simultaneously on the same resource blocks (RBs) in cell 1, cell 2 and cell 3. For instance, as shown in FIG. 7, UEs (0, 4, 6) are candidate group of UEs. In other words, "UEs (0, 4, 6)" indicated a UE group comprising UE0 in cell 1, UE4 in cell 2 and UE6 in cell 3.

At step S304, one or more beamforming vectors associated with the one or more UE groups are calculated.

According to embodiments of the present invention, a signal leakage value of the at least one interfering cell to the at least one interfered cell may be calculated with respect to a UE group. Then, a beamforming vector minimizing the signal leakage value may be determined as the beamforming vector associated with the UE group. In embodiments of the present invention, the signal leakage value may be exemplarily illustrated as signal-to-leakage-noise ratio (SLNR), and a beamforming vector maximizing the SLNR may be determined as the beamforming vector associated with the UE group.

Referring to embodiments illustrated with FIG. 7, there are 3 cells in the cell cluster, wherein two of them are in the DL subframe (the fifth subframe) while the other one is in the UL subframe. Beamforming vectors of BS-a 701 and BS-b 702 (denoted as $F_a$ and $F_b$, respectively) may be calculated based on the SLNR.

For a UE group, e.g., UEs (0, 4, 6), the modified SLNR assuming transmission from BS-a 701 to UE0 720 may be expressed as $$SLNR(F_a) = \frac{tr(F_a^H R_0^a F_a)}{tr(F_a^H R_c^a F_a / I_c) + \alpha} \quad (5)$$

where α is a regulation factor;

$I_c$ represents the interference observed at BS-c 703 excluding the interference from its own serving cell and BS-a 701;

$R_0^a$ represents the statistical spatial correlation matrix observed by UE0 720 and BS-a 701; and $R_c^a$ represents the statistical spatial correlation matrix observed by BS-c 703 and BS-a 701.

In the disclosure, the statistical spatial correlation matrix observed by receiver-i and transmitter-j is denoted as $R_i^j$, which can be accumulated in one or more subframes, over the entire band or a sub-band. In some embodiments, $R_i^j$ may be calculated by $$R_i^j = \frac{1}{|T|} \sum_{l \in T} \frac{1}{|S|} \sum_{k \in S} H_{i,j,k,t}^H H_{i,j,k,t} \quad (6)$$

Here, T represents for the set of subframes accumulated; S is the set of subcarriers, corresponding to a sub-band (including the special case of a single sub-carrier), the whole transmission band, or a single component carrier in the case of spectrum aggregation; and $H_{i,j,k,t}$ denotes the small scale fading channel between i and j, on subcarrier k, in subframe t.

According to calculation of the statistical spatial correlation matrix $R_i^j$, the statistical spatial correlation matrices $R_0^a$ and $R_c^a$ in equation (5) can be determined accordingly.

The corresponding beamforming vector at BS-a 701 may be then calculated as:

$$F_a = eig\{(R_c^a/I_c + \alpha I)^{-1} R_0^a\} \quad (7)$$

where eig{M} is a function that calculates the eigen vectors corresponding to the largest L eigen values of the input matrix M, and L represents the transmission rank to the UE. For example, L=1.

The corresponding beamforming vector at BS-b 702 may be then calculated as:

$$F_b = eig\{(R_c^b/I_c + \alpha I)^{-1} R_4^b\} \quad (8)$$

where $R_4^b$ represents the statistical spatial correlation matrix observed by UE4 724 and BS-b 702; and $R_c^b$ represents the statistical spatial correlation matrix observed by BS-c 703 and BS-b 702.

Referring to embodiments illustrated with FIG. 8, there are 3 cells in the cell cluster, wherein two of them are in the UL subframe (the fifth subframe) while the other one is in the DL subframe. Beamforming vectors of BS-a 801 and BS-b 802 (denoted as $F_a$) may be calculated based on the SLNR.

Referring to embodiments illustrated with FIG. 8, there are 3 cells in the cell cluster, wherein two of them are in the UL subframe (the fifth subframe) while the other one is in the DL subframe. The downlink transmission from BS-a 801 in cell 4 may interfere with uplink transmissions in cell 5 and cell 6. The beamforming vector of BS-a 701 (denoted as $F_a$) may be calculated based on the SLNR as follows:

As illustrated in FIG. 8, UE0, 1, 2, . . . , 7 are candidate UEs that have either DL or UL packets to transmit or receive. For a UE group, e.g., UEs (0, 3, 6), the modified SLNR assuming transmission from BS-a 801 to UE0 820 may be expressed as:

$$SLNR(F_a) = \frac{tr(F_a^H R_0^a F_a)}{tr\left(\frac{F_a^H (R_c^a + R_b^a) F_a}{I_b + I_c}\right) + \alpha} \quad (9)$$

where $\alpha$ is a regulation factor;

$I_b$ and $I_c$ represent the interference observed at BS-b and BS-c excluding the interference from their own serving cells and BS-a;

$R_0^a$ represents the statistical spatial correlation matrix observed by UE0 820 and BS-a 801;

$R_c^a$ represents the statistical spatial correlation matrix observed by BS-c 803 and BS-a 801; and $R_c^b$ represents the statistical spatial correlation matrix observed by BS-c 803 and BS-b 802.

According to embodiments of the present invention, the above statistical spatial correlation matrices may be obtain in several ways, for example, calculated according to equation (6).

The corresponding beamforming vector at BS-a 801 may be then calculated as:

$$F_a = eig\left\{\left(\frac{R_b^a + R_c^a}{I_b + I_c} + \alpha I\right)^{-1} R_0^a\right\} \quad (10)$$

where eig{M} is a function that calculates the eigen vectors corresponding to the largest L eigen values of the input matrix M, and L represents the transmission rank to the UE. For example, L=1.

It is noted that, the embodiments regarding FIG. 8 are relate to determination of a beamforming vector of the interfering cell (i.e., cell 4) with respect to one user group. With respect to different user groups, more beamforming vectors of the interfering cell may be determined.

At step S305, a beamforming vector maximizing uplink capacity of the at least one interfered cell is selected from the one or more beamforming vectors.

According to embodiments of the present invention, the uplink capacity of the at least one interfered cell may be obtained by calculating a capability value of the at least one interfered cell. In some embodiments, capability values of the at least one interfered cell may be first calculated based on the one or more beamforming vectors; and then the beamforming vector associated with the largest one of the calculated capability values may be selected from the one or more beamforming vectors. According to embodiments of the present invention, the uplink capacity of the at least one interfered cell may be obtained by calculating a capability value of the at least one interfered cell.

Reference is now made to embodiments shown with FIG. 7, in which the capability value of an interfered cell may be exemplarily calculated with respect to the UE group, UEs (0, 4, 6), as follows:

$$C_U = \log\left\{\det\left[I + \frac{R_c^6}{tr(F_a^H R_c^a F_a + F_b^H R_c^b F_b)/N_r^{RRU} + N_a}\right]\right\} \quad (11)$$

where $F_a$ and $F_b$ are beamforming vectors of BS-a 701 and BS-b 702, respectively;

$N_r^{RRU}$ is the number of receive antennas at the BSs (in this embodiment, the BSs are illustrated as RRUs);

$N_a$ represents the per-antenna residue interference and average noise powers sent at BS-a 701;

$R_c^6$ represents the statistical spatial correlation matrix observed by BS-c 703 and UE6 726;

$R_c^a$ represents the statistical spatial correlation matrix observed by BS-c 703 and BS-a 701; and $R_c^b$ represents the statistical spatial correlation matrix observed by BS-c 703 and BS-b 702.

The maximization of the above metric $C_U$ may be obtained by solving $$\max_{Fa,Fb} C_U \qquad (12)$$
$$\text{s.t., } tr(F_a^H F_a) \leq P_t^{RRU}, tr(F_b^H F_b) \leq P_t^{RRU}$$

where $P_t^{RRU}$ is the transmit power constraint on RRUs.

Since beamforming vectors of BS-a and beamforming vectors of BS-b may be calculated at step S304 with respect to multiple UE groups, the maximized capability value may be determined by comparing multiple $C_U$ obtained according to equation (11) with these beamforming vectors. In this way, a beamforming vector maximizing uplink capacity of the interfered cell, i.e., cell 3, may be selected from the beamforming vectors obtained at step S304.

Reference is now made to embodiments shown with FIG. 8, in which the capability value of an interfered cell may be exemplarily calculated with respect to the UE group, UEs (0, 3, 6), as follows:

$$C_U = \log\left\{\det\left[I + \frac{R_c^6}{tr(F_a^H R_c^a F_a + R_c^3)/N_r^{RRU} + N_a}\right]\right\} + \qquad (13)$$
$$\log\left\{\det\left[I + \frac{R_b^3}{tr(F_a^H R_b^a F_a + R_b^6)/N_r^{RRU} + N_b}\right]\right\}$$

where $F_a$ is the beamforming vector of BS-a 801;

$N_r^{RRU}$ is the number of receive antennas at the BSs (in this embodiment, the BSs are illustrated as RRUs);

$N_a$ and $N_b$ represent the per-antenna residue interference and average noise powers sent at BS-a 801 and BS-b 802, respectively;

$R_c^6$ represents the statistical spatial correlation matrix observed by BS-c 803 and UE6 826;

$R_c^3$ represents the statistical spatial correlation matrix observed by BS-c 803 and UE3 823;

$R_c^a$ represents the statistical spatial correlation matrix observed by BS-c 803 and BS-a 801;

$R_b^6$ represents the statistical spatial correlation matrix observed by BS-b 802 and UE6 826;

$R_b^3$ represents the statistical spatial correlation matrix observed by BS-b 802 and UE3 823; and $R_b^a$ represents the statistical spatial correlation matrix observed by BS-b 802 and BS-a 801.

The maximization of the above metric $C_U$ may be obtained by solving $$\max_{F_a} C_U \qquad (14)$$
$$\text{s.t., } tr(F_a^H F_a) \leq P_t^{RRU}$$

where $P_t^{RRU}$ is the transmit power constraint on RRUs, i.e., BSs.

Since a plurality of beamforming vectors of BS-a may be calculated at step S304 with respect to multiple UE groups, the maximized capability value may be determined by comparing multiple $C_U$ obtained according to equation (13) with these beamforming vectors. In this way, a beamforming vector maximizing uplink capacity of the interfered cells, i.e., cell 5 and cell 6, may be selected for the interfering cell 4.

With the selected beamforming vector(s), e.g., the beamforming vectors $F_a$ and $F_b$ in embodiments of FIG. 7, the interfering cells (cell 1 and cell 2) may perform beamforming with the beamforming vectors $F_a$ and $F_b$, respectively, such that the cross-subframe interference to cell 3 may be reduced.

Likewise, in embodiments of FIG. 8, with the selected beamforming vector $F_a$, the interfering cell (cell 4) may perform beamforming with the beamforming vectors $F_a$, such that the cross-subframe interference to cell 2 and cell 3 may be reduced.

It is worth noting here that the methods according to embodiments of the present invention may be extended to the case that the maximum number of cells within one cell cluster is larger than three, i.e., with more interference scenarios; the direct extension of the proposed scheme in this disclosure to the above case may compromise the achievable performance gain and the design degree of freedom (DoF). For example, a possible solution would be that down-selecting two or three cells out of all the cells within the same cluster to perform the methods according to embodiments of the present invention.

With respect to embodiments illustrated by FIG. 3, it is advantageous that, downlink beamforming vectors accounting for the power leakage to the uplink UEs are generated, so that the cross-subframe interference may be effectively reduced. It is also advantageous that, the uplink UEs may be scheduled on RBs that are less affected by the BS-BS cross-subframe interference.

Figure 4:
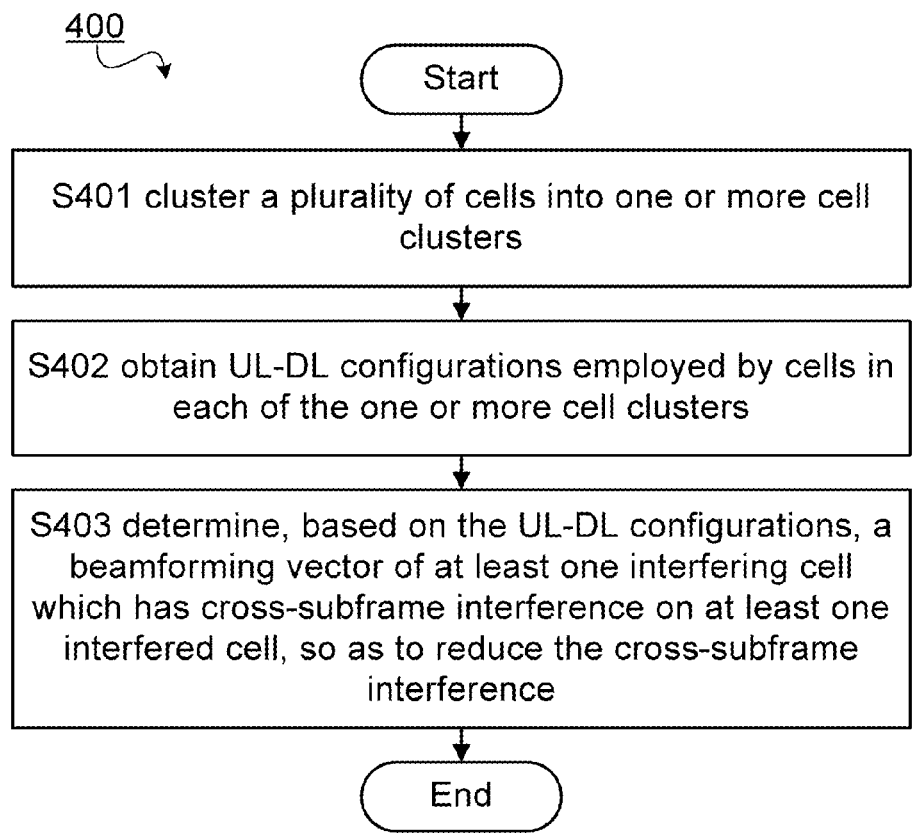
FIG. 4 illustrates a flow chart of a method 400 for cross-subframe interference coordination in a dynamic TDD system according to still further embodiments of the invention.

FIG. 4 illustrates a flow chart of a flow chart of a method 400 for cross-subframe interference coordination in a dynamic TDD system according to still further embodiments of the invention. Method 400 may be considered as an embodiment of method 200 described above with reference to FIG. 2. In the following description of method 400, the cells in the dynamic TDD system are clustered into one or more cell clusters and the method 200 may be implemented on the cells in each cell cluster. In this way, the cross-subframe interference of interfering cell(s) on interfered cell(s) in each cell cluster may be reduced. However, it is noted that this is only for the purpose of illustrating the principles of the present invention, rather than limiting the scope thereof.

At step S401, a plurality of cells are clustered into one or more cell clusters.

According embodiments of the present invention, cells may be clustered into cell clusters in several ways. For example, Cross-subframe Co-channel Interference (CCI) indications between a reference cell and the plurality of the cells may be determined, wherein the reference cell is randomly selected from the plurality of the cells; and the plurality of the cells may be clustered into one or more cell clusters based on the CCI indications.

When clustering the plurality of the cells into one or more cell clusters based on the CCI indications, in some embodiments, cells associated with CCI indications exceeding a predetermined threshold may be classified into a cell cluster. In some other embodiments, a set of CCI indications exceeding a predetermined may be first determined, a predetermined number of CCI indications may be selected from the set in descending order, and the predetermined number of CCI indications may be classified into a cell cluster.

According embodiments of the present invention, the cell clustering may be conducted either in a dynamic manner or a semi-static manner. The time-scale for cell clustering can be in the order of millisecond, second, minutes, hour and etc.

Figure 5:
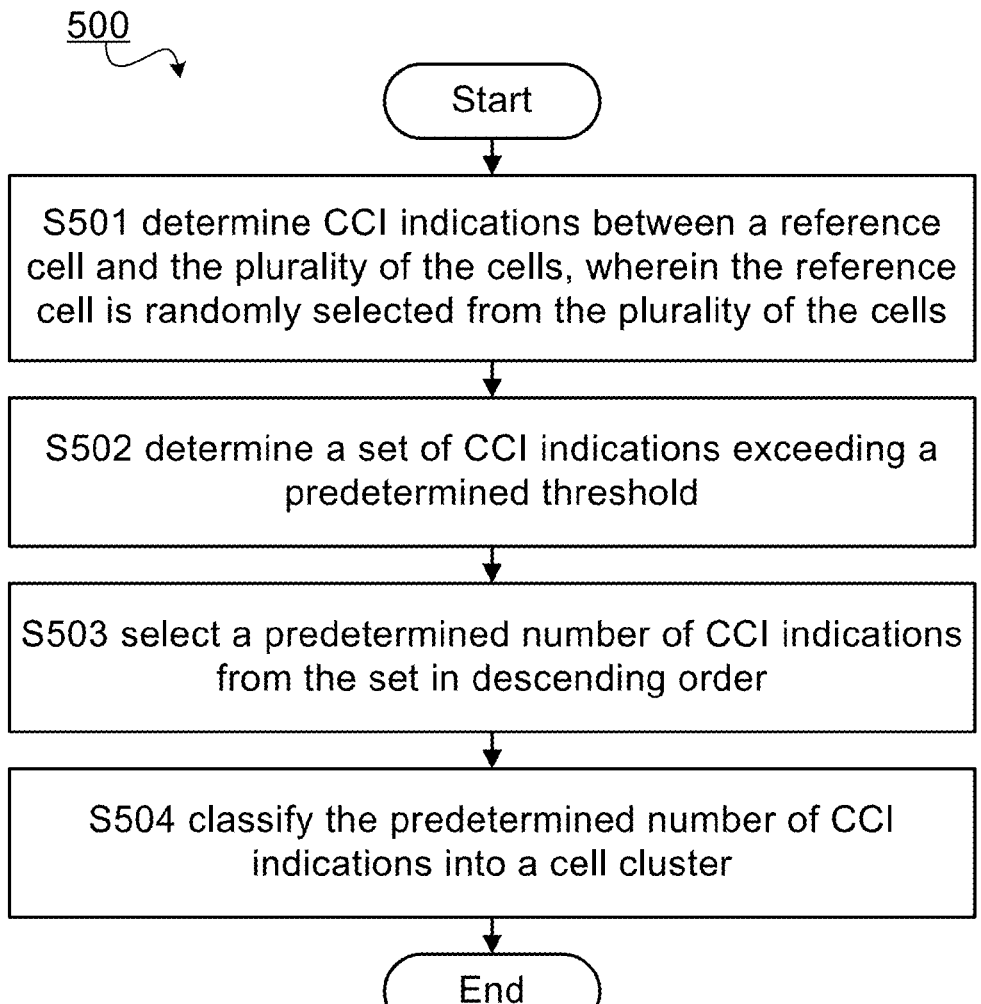
FIG. 5 illustrates a flow chart of a method 500 for clustering cells in the dynamic TDD system into one or more cell clusters according to embodiments of the invention.

Further details relating to the clustering may be found in descriptions in connection to embodiments illustrated with FIG. 5.

At step S402, UL-DL configurations employed by cells in each of the one or more cell clusters are obtained.

Step S402 in method 400 may be considered as an implementation of step S201 in method 200 as described above. Similar with step S201, UL-DL configurations employed by a plurality of cells in the dynamic TDD system are also obtained at S402. Specifically, the UL-DL configurations obtained at step S402 are configurations dynamically allocated to cells in each cell cluster, rather than all cells in the dynamic TDD system. For example, assuming a dynamic TDD system comprises five cells, wherein three of them are classified into a first cell cluster and the other two are classified into a second cell cluster, the UL-DL configurations employed by cells in the first cell cluster and the UL-DL configurations employed by cells in the second cell cluster may be obtained at step S402.

At step S403, a beamforming vector of at least one interfering cell which has cross-subframe interference on at least one interfered cell is determined based on the UL-DL configurations, so as to reduce the cross-subframe interference.

Step S403 in method 400 may be considered as an implementation of step S202 in method 200 as described above. Similar with step S202, a beamforming vector of at least one interfering cell which has cross-subframe interference on at least one interfered cell is also determined based on the UL-DL configurations at S403. More specifically, the beamforming vector is determined with respect to cells in one cell cluster, rather than all cells in the TDD system.

FIG. 5 illustrates a flow chart of a flow chart of a method 500 for cross-subframe interference coordination in a dynamic TDD system according to still further embodiments of the invention. Method 500 may be considered as an embodiment of step S401 of method 400 described above with reference to FIG. 4. However, it is noted that this is only for the purpose of illustrating the principles of the present invention, rather than limiting the scope thereof.

At step S501, CCI indications between a reference cell and the plurality of the cells are determined, wherein the reference cell is randomly selected from the plurality of the cells.

In accordance with embodiments of the present invention, the CCI indication may indicate the propagation property between two cells. The CCI indication may be path loss, mutual coupling loss (MCL) and/or other suitable factors.

According to embodiments of the present invention, there may be several ways to obtain the CCI indication. For example, assuming that a RRU0 perform downlink transmission with its UE and interferes with RRU1 which is receiving uplink transmission from its UE, the MCL between RRU0 and RRU1 may be calculated as follows:

$$MCL_{RRU0\text{-}RRU1} = TAG_{RRU0} + RAG_{RRU1} - PL_{RRU0\text{-}RRU1} \quad (14)$$

where $TAG_{RRU0}$ and $RAG_{RRU1}$ denote the transmit and receive antenna gains of RRU0 and RRU1, respectively; and $PL_{RRU0\text{-}RRU1}$ is the propagation loss between RRU0 and RRU1.

Based on the MCL between RRU0 and RRU1, the interference between RRU0 and RRU1 may be obtained, e.g., as follows:

$$I_{RRU0\text{->}RRU1} = P_{RRU0} + TAG_{RRU0} + RAG_{RRU1} - PL_{RRU0\text{-}RRU1} \quad (15)$$

where $P_{RRU0}$ represents the transmitted signal power from RRU0.

From equations (14) and (15), it is seen that the MCL indicates the interference between the two BSs. In other words, the MCL between RRUs/cells implies the potential RRU-RRU CCI level.

In determination of CCI indications between a reference cell and the plurality of the cells, first, a cell may be randomly selected as the anchor point (hereafter, "reference cell"). Based on the equation (14), the MCLs between the reference cell with any of the plurality of the cells may be obtained. For example, assuming there are three cells (cell 1, cell 2, cell 3) in a dynamic TDD system, if cell 1 is randomly selected as the reference cell, the MCL1 between cell 1 and cell 2 and the MCL2 between cell 1 and cell 3 may be obtained at step S501.

At step S502, a set of CCI indications exceeding a predetermined threshold are determined.

As can be appreciated by those skilled in the art, the predetermined threshold is not limited to be a fixed value, instead, it is configurable. Those skilled in the art may predefine or preset the threshold according to his/her experience, system conditions, historical values and/or other factors.

For example, the predetermined MCL threshold may be set to be −70 dB and a MCL determined at step S501 is −40 dB. Since −40 dB is larger than −70 dB, it may be determined that the MCL exceeds the predetermined threshold.

By comparing the CCI indications obtained at step S501 with the predetermined threshold, the CCI indications exceeding the predetermined threshold may be determined. For example, in view of the MCL1 between cell 1 and cell 2 and the MCL2 between cell 1 and cell 3 obtained at step S501, MCL1 and MCL2 may be compared with the predetermined threshold, so as to determine whether they exceed the threshold.

At step S503, a predetermined number of CCI indications are selected from the set in descending order.

According to embodiments of the present invention, the predetermined number may be preset or predefined according to system requirements or conditions. For example, the predetermined number may be set as 3. In other words, 3 CCI indications are to be selected from the set of CCI indications exceeding the predetermined threshold. In some embodiments, if 10 CCI indications are determined at step S501 and a set of 5 CCI indications are determined as exceeding a predetermined threshold at step S502, then 3 CCI indications may be selected from the set of CCI indications in descending order. That is, the larger three CCI indications are selected from the 5 CCI indications in the set.

At step S504, the predetermined number of CCI indications are classified into a cell cluster.

As discussed above, if the largest three CCI indications are selected from the set of 5 CCI indications, the largest three CCI indications may be classified into a cell cluster. In some other embodiments, if the set determined at step S502 comprises 1 or 2 CCI indications, less than the predetermined number, 3, then the 1 or 2 CCI indications may be classified into a cell cluster.

According to embodiments of the present invention, pseudo-codes of the MCL assisted cell clustering illustrated above may be provided as follows, in which τ denotes the MCL threshold and $N_{RRU}$ represents the total number of RRUs.

```
 1: Input: MCL_{RRU0-RRU1}, MCL_{RRU0-RRU2}, ···,
       MCL_{RRUx-RRUy}, ···; τ; N_{RRU}
 2: Output: Clustering of RRUs
 3: while All cell clusters are formed do
 4:     start: randomly select one RRU (RRUx) that has not been chosen
           so for
 5:     initialize: the cell cluster set anchored at RRUx (i.e., {CCx})
 6:     for n = 1, ···, N_{RRU} do
 7:         if n ≠ x then
 8:             find the three smallest MCLs to RRUx
 9:         end if
10:     end for
11:     the corresponding three RRUs are RRU_a, RRU_b and RRU_c
12:     for m = a, b, c do
13:         if MCL_{RRUx-RRUm} < τ then
14:             {CCx} ← RRUm
15:         end if
16:     end for
17: end while
```

It is to be noted that, the cell clustering according to embodiments of the present invention may be implemented in other suitable ways. The above pseudo-codes are illustrated in the present disclosure for purpose of example, rather than limitation.

Figure 6:
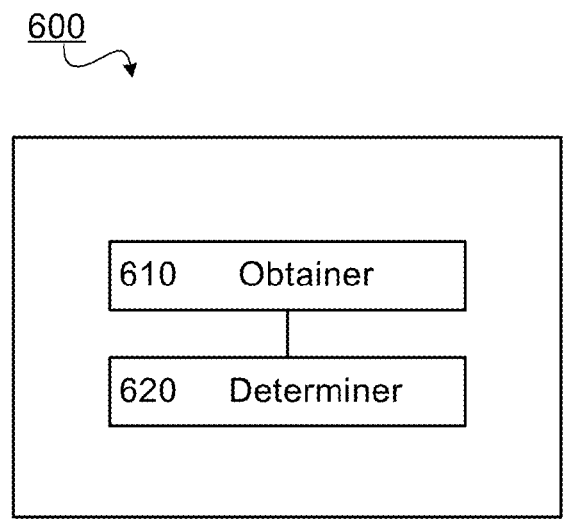
FIG. 6 illustrates a block diagram of an apparatus 600 for cross-subframe interference coordination in a dynamic TDD system according to embodiments of the invention.

Reference is now made to FIG. 6, which illustrates a block diagram of apparatus 600 for cross-subframe interference coordination in a dynamic TDD system according to embodiments of the invention. As shown, the apparatus 600 comprises: an obtainer 610 configured to obtain UL-DL configurations employed by a plurality of cells in the dynamic TDD system; and a determiner 620 configured to determine, based on the UL-DL configurations, a beamforming vector of at least one interfering cell which has cross-subframe interference on at least one interfered cell, so as to reduce the cross-subframe interference. In accordance with embodiments of the present invention, the apparatus 600 may be implemented in a BS, a Baseband Unit (BBU) pool, a central unit, a controller, a server or any other suitable device.

According to embodiments of the present invention, the determiner 620 may comprise: a first determining unit configured to determine at least one interfering cell and at least one interfered cell from the plurality of cells based on the UL-DL configurations; a dividing unit configured to divide UEs in the at least one interfering cell and the at least one interfered cell into one or more UE groups, wherein a UE group at least includes a UE in the at least one interfering cell and a UE in the at least one interfered cell; a first calculating unit configured to calculate one or more beamforming vectors associated with the one or more UE groups; and a first selecting unit configured to select, from the one or more beamforming vectors, a beamforming vector maximizing uplink capacity of the at least one interfered cell.

According to embodiments of the present invention, the first calculating unit of the determiner 620 may comprise: a second calculating unit configured to calculate a signal leakage value with respect to a UE group, wherein the signal leakage value indicating signal leakage from the at least one interfering cell to the at least one interfered cell; and a second determining unit configured to determine a beamforming vector minimizing the signal leakage value as the beamforming vector associated with the UE group.

According to embodiments of the present invention, the first selecting unit of the determiner 620 may comprise: a third calculating unit configured to calculate capability values of the at least one interfered cell based on the one or more beamforming vectors; and a second selecting unit configured to select the beamforming vector associated with the largest one of the calculated capability values from the one or more beamforming vectors.

According to embodiments of the present invention, the obtainer 610 may comprise: a first clustering unit configured to cluster the plurality of the cells into one or more cell clusters; and a first obtaining unit configured to obtain UL-DL configurations employed by cells in each of the one or more cell clusters.

According to embodiments of the present invention, the first clustering unit of the obtainer 610 may comprise: a third determining unit configured to determine Cross-subframe Co-channel Interference (CCI) indications between a reference cell and the plurality of the cells, wherein the reference cell is randomly selected from the plurality of cells; and a second clustering unit configured to cluster clustering the plurality of the cells into one or more cell clusters based on the CCI indications.

According to embodiments of the present invention, the second clustering unit may comprise: a first classifying unit configured to classify cells associated with CCI indications exceeding a predetermined threshold into a cell cluster.

According to embodiments of the present invention, the second clustering unit may comprise: a fourth determining unit configured to determine a set of CCI indications exceeding a predetermined threshold; a third selecting unit configured to select a predetermined number of CCI indications from the set in descending order; and a second classifying unit configured to classify the predetermined number of CCI indications into a cell cluster.

According to embodiments of the present invention, the obtainer 610 may comprise: a receiving unit configured to receive UL-DL configurations dynamically allocated to the plurality of cells.

According to embodiments of the present invention, for each cell of the plurality of cells, the UL-DL configuration is dynamically allocated based on DL to UL subframe ratios of available configurations and DL to UL data ratio of the each cell.

It is noted that the apparatus 600 may be configured to implement functionalities as described with reference to FIGS. 2-5. Therefore, the features discussed with respect to any of methods 200, 300, 400 and 500 may apply to the corresponding components of the apparatus 600. It is further noted that the components of the apparatus 600 may be embodied in hardware, software, firmware, and/or any combination thereof. For example, the components of the apparatus 600 may be respectively implemented by a circuit, a processor or any other appropriate selection device. Those skilled in the art will appreciate that the aforesaid examples are only for illustration not limitation.

In some embodiment of the present disclosure, the apparatus 600 comprises at least one processor. The at least one processor suitable for use with embodiments of the present disclosure may include, by way of example, both general and special purpose processors already known or developed in the future. The apparatus 600 further comprises at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause the apparatus 600 to at least perform according to any of methods 200-500 as discussed above.

Based on the above description, the skilled in the art would appreciate that the present disclosure may be embodied in an apparatus, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIGS. 2-5 may be viewed as method steps, and/or as operations that result from operation of computer program code, and/or as a plurality of coupled logic circuit elements constructed to carry out the associated function(s). At least some aspects of the exemplary embodiments of the disclosures may be practiced in various components such as integrated circuit chips and modules, and that the exemplary embodiments of this disclosure may be realized in an apparatus that is embodied as an integrated circuit, FPGA or ASIC that is configurable to operate in accordance with the exemplary embodiments of the present disclosure.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method for cross-subframe interference coordination in a dynamic Time Division Duplex (TDD) system, comprising:
    obtaining uplink (UL)-downlink (DL) configurations employed by a plurality of cells in the dynamic TDD system; and
    determining a beamforming vector of at least one interfering cell of the plurality of cells which has cross-subframe interference on at least one interfered cell of the plurality of cells, based on the UL-DL configurations and uplink capacity of the at least one interfered cell, so as to reduce the cross-subframe interference,
    wherein determining a beamforming vector of the at least one interfering cell which has cross-subframe interference on the at least one interfered cell comprises:
    determining the at least one interfering cell and the at least one interfered cell from the plurality of cells based on the UL-DL configurations;
    dividing UEs in the at least one interfering cell and the at least one interfered cell into one or more UE groups, wherein a UE group at least includes a UE in the at least one interfering cell and a UE in the at least one interfered cell;
    calculating one or more beamforming vectors associated with the one or more UE groups; and
    selecting, from the one or more beamforming vectors, a beamforming vector maximizing the uplink capacity of the at least one interfered cell.

2. The method of claim 1, wherein calculating one or more beamforming vectors associated with the one or more UE groups comprises:
    calculating a signal leakage value with respect to a UE group, wherein the signal leakage value indicating signal leakage from the at least one interfering cell to the at least one interfered cell; and
    determining a beamforming vector minimizing the signal leakage value as the beamforming vector associated with the UE group.

3. The method of claim 1, wherein selecting, from the one or more beamforming vectors, a beamforming vector maximizing uplink capacity of the at least one interfered cell comprises:
    calculating capability values of the at least one interfered cell based on the one or more beamforming vectors; and
    selecting the beamforming vector associated with the largest one of the calculated capability values from the one or more beamforming vectors.

4. The method of claim 1, wherein obtaining UL-DL configurations employed by a plurality of cells in a dynamic TDD system comprises:
    clustering the plurality of the cells into one or more cell clusters; and obtaining UL-DL configurations employed by cells in each of the one or more cell clusters.

5. The method of claim 4, wherein clustering the plurality of the cells into one or more cell clusters comprises:
   determining Cross-subframe Co-channel Interference (CCI) indications between a reference cell and the plurality of the cells, wherein the reference cell is randomly selected from the plurality of the cells; and
   clustering the plurality of the cells into one or more cell clusters based on the CCI indications.

6. The method of claim 5, wherein clustering the plurality of the cells into one or more cell clusters based on the CCI indications comprises:
   classifying cells associated with CCI indications exceeding a predetermined threshold into a cell cluster.

7. The method of claim 5, wherein clustering the plurality of the cells into one or more cell clusters based on the CCI indications comprises:
   determining a set of CCI indications exceeding a predetermined threshold;
   selecting a predetermined number of CCI indications from the set in descending order; and
   classifying the predetermined number of CCI indications into a cell cluster.

8. The method of claim 1, wherein obtaining UL-DL configurations comprises:
   receiving UL-DL configurations dynamically allocated to the plurality of cells.

9. The method of any of claim 8, wherein for each cell of the plurality of cells, the UL-DL configuration is dynamically allocated based on DL to UL subframe ratios of available configurations and DL to UL data ratio of the each cell.

10. An apparatus for cross-subframe interference coordination in a dynamic Time Division Duplex (TDD) system, comprising:
    a processor; and
    a memory storing instructions executable by the processor,
    wherein the processor is configured to obtain uplink (UL)-downlink (DL) configurations employed by a plurality of cells in the dynamic TDD system and
    to determine a beamforming vector of at least one interfering cell of the plurality of cells which has cross-subframe interference on at least one interfered cell of the plurality of cells, based on the UL-DL, configurations and uplink capacity of the at least one interfered cell, so as to reduce the cross-subframe interference,
    wherein the processor is further configured to determine the at least one interfering cell and the at least one interfered cell from the plurality of cells based on the UL-DL configurations,
    to divide UEs in the at least one interfering cell and the at least one interfered cell into one or more UE groups, a UE group at least including a UE in the at least one interfering cell and a UE in the at least one interfered cell,
    to calculate one or more beamforming vectors associated with the one or more UE groups and
    to select, from the one or more beamforming vectors, a beamforming vector maximizing the uplink capacity of the at least one interfered cell.

11. The apparatus of claim 10, wherein the processor is further configured to calculate a signal leakage value with respect to a UE group, the signal leakage value indicating signal leakage from the at least one interfering cell to the at least one interfered cell and to determine a beamforming vector minimizing the signal leakage value as the beamforming vector associated with the UE group.

12. The apparatus of claim 10, wherein the processor is further configured to calculate capability values of the at least one interfered cell based on the one or more beamforming vectors and to select the beamforming vector associated with the largest one of the calculated capability values from the one or more beamforming vectors.

13. The apparatus of claim 10, wherein the processor is further configured to cluster the plurality of the cells into one or more cell clusters and to obtain UL-DL configurations employed by cells in each of the one or more cell clusters.

14. The apparatus of claim 13, wherein the processor is further configured to determine Cross-subframe Co-channel Interference (CCI) indications between a reference cell and the plurality of the cells, wherein the reference cell is randomly selected from the plurality of the cells and to cluster clustering the plurality of the cells into one or more cell clusters based on the CCI indications.

15. The apparatus of claim 14, wherein the processor is further configured to classify cells associated with CCI indications exceeding a predetermined threshold into a cell cluster.

16. The apparatus of claim 14, wherein the processor is further configured to determine a set of CCI indications exceeding a predetermined threshold, to select a predetermined number of CCI indications from the set in descending order and to classify the predetermined number of CCI indications into a cell cluster.

17. The apparatus of claim 10, wherein the processor is further configured to receive UL-DL configurations dynamically allocated to the plurality of cells.

18. The apparatus of any of claim 17, wherein for each cell of the plurality of cells, the UL-DL configuration is dynamically allocated based on DL to UL subframe ratios of available configurations and DL to UL data ratio of the each cell.

* * * * *